(12) United States Patent
Schmitt et al.

(10) Patent No.: US 10,936,400 B2
(45) Date of Patent: Mar. 2, 2021

(54) DYNAMIC HANDLING OF CALLHOME DATA

(71) Applicant: International Business Machines Corporation, Armonk, NY (US)

(72) Inventors: Christof Schmitt, Tucson, AZ (US); Erik Rueger, Ockenheim (DE)

(73) Assignee: International Business Machines Corporation, Armonk, NY (US)

(*) Notice: Subject to any disclaimer, the term of this patent is extended or adjusted under 35 U.S.C. 154(b) by 224 days.

(21) Appl. No.: 16/209,825

(22) Filed: Dec. 4, 2018

(65) Prior Publication Data

US 2020/0174878 A1 Jun. 4, 2020

(51) Int. Cl.
| | |
|---|---|
| *G06F 11/00* | (2006.01) |
| *G06F 11/07* | (2006.01) |
| *G06F 9/54* | (2006.01) |
| *G06F 11/30* | (2006.01) |

(52) U.S. Cl.
CPC .......... *G06F 11/0784* (2013.01); *G06F 9/542* (2013.01); *G06F 11/0778* (2013.01); *G06F 11/3065* (2013.01)

(58) Field of Classification Search
CPC ............. G06F 11/0784; G06F 11/0778; G06F 11/3065; G06F 11/0775; G06F 11/0781; G06F 9/542
See application file for complete search history.

(56) References Cited

U.S. PATENT DOCUMENTS

| | | | | |
|---|---|---|---|---|
| 6,751,758 | B1* | 6/2004 | Alipui | G06F 11/0781 714/42 |
| 9,742,624 | B2* | 8/2017 | Hanckel | H04L 41/0609 |
| 2004/0093405 | A1* | 5/2004 | 't Hooft | G06F 11/0784 709/224 |
| 2006/0136784 | A1* | 6/2006 | Prescott | G06F 11/0748 714/38.11 |
| 2011/0314339 | A1 | 12/2011 | Daily et al. | |
| 2015/0220379 | A1 | 8/2015 | Ahrens et al. | |
| 2017/0262329 | A1 | 9/2017 | Lehmann et al. | |
| 2018/0023833 | A1 | 1/2018 | Matsuoka et al. | |
| 2019/0114559 | A1* | 4/2019 | Evans | G06N 3/006 |

* cited by examiner

*Primary Examiner* — Philip Guyton
(74) *Attorney, Agent, or Firm* — Kunzler Bean & Adamson

(57) ABSTRACT

Methods and systems for dynamic handling of call home data are provided. A system for providing dynamic handling of call home data includes an event detection module that detects one or more events in the operation of one or more components. The system may also include a data request module that requests call home instructions from an upload data manager in response to the detected one or more events. Also, the upload data manager provides call home instructions. The system may further include a call home transmission module that collects call home data based on the call home instructions and provides the collected data to an upload server.

20 Claims, 9 Drawing Sheets

DYNAMIC HANDLING OF CALLHOME DATA

FIELD

This invention relates to storage systems and more particularly relates to methods and systems for dynamic handling of call home data.

BACKGROUND

Storage systems often offer call home mechanisms. In call home mechanisms, a storage system automatically sends subsets of data logs and configuration data to a support server when a problem arises on the storage system. In some embodiments, the automatically sent data logs and configuration data may contain a limited amount of data. However, the storage system may also store an extensive amount of data in collected log files. When the automatically sent data is insufficient, the storage system may respond to a request for more data by sending the collected log files. Since the data logs and configuration data include substantial amounts of data, the uploading of the data to the support server may take a large amount of time. Also, when a customer system experiences an operational problem, customer support may try to notify all customers that might be experiencing similar problems. In some embodiments, technical support may be unable to diagnose arbitrary problem due to the limited amount of uploaded call home data. As such, the customer support may request data from all customers to determine which customers have the problem.

SUMMARY

Methods and systems for dynamic handling of call home data are provided. A system for providing dynamic handling of call home data includes an event detection module that detects one or more events in the operation of one or more components. The system may also include a data request module that requests call home instructions from an upload data manager in response to the detected one or more events. Also, the upload data manager provides call home instructions. The system may further include a call home transmission module that collects call home data based on the call home instructions and provides the collected data to an upload server.

In certain embodiments, the one or more events include a trigger that causes a device in the one or more components to request the call home instructions. Additionally, the one or more events includes an error condition.

In further embodiments, the data request module includes a context module that gathers context information related to the one or more events. The context information identifies an error and at least one device in the one or more components. Also, the upload data manager specifies a log level based on the context information. The upload data manager provides the log level as part of the call home instructions, the log level specifying the information to be sent to the upload server from the one or more components.

In some embodiments, the system includes an update module that updates a call home definition for the upload data manager. Further, the call home definition is manually configured. Also, the update module acquires information from a support problem database and defines the call home definition based on the acquired information. Additionally, the update module analyzes previously received call home data, identifies data access and the previously received call home data during troubleshooting, and removes data specified in the call home definition that is associated with previously received call home data that was not updated during the troubleshooting.

One method includes detecting one or more events in the operation of one or more components. The method also includes requesting call home instructions from an upload data manager in response to the detected one or more events. The upload data manager provides call home instructions. The method further includes collecting call home data based on the call home instructions. Additionally, the method includes providing the collected data to an upload server.

In certain embodiments, a method includes gathering context information related to the one or more events. Additionally, the context information identifies an error and at least one device in the one or more components. Additionally, the upload data manager specifies a log level based on the context information. Further, the upload data manager provides the log level as part of the call home instructions, the log level specifying the information to be sent to the upload server from the one or more components.

In additional embodiments, the method includes updating a call home definition for the upload data manager. Additionally, the call home definition is manually configured. Further, the method includes acquiring information from a support problem database and defining the call home definition based on the acquired information. Also, the method includes analyzing previously received call home data, identifying data accessed in the previously received call home data during troubleshooting, and removing data specified in the call home definition that is associated with previously received call home data that was not updated during the troubleshooting.

Also, disclosed are computer program products including a computer-readable storage medium that include program instructions embodied therewith for dynamic handling of call home data. Some program instructions executable by a processor cause the processor to detect one or more events in the operation of one or more components. Further, the program instructions cause the processor to request call home instructions from an upload data manager in response to the detected one or more events, wherein the upload data manager provides call home instructions. Also, the program instructions cause the processor to collect call home data based on the call home instructions. Further, the program instructions cause the processor to provide the collected data to an upload server.

In certain embodiments, the program instructions cause the processor to gather context information related to the one or more events.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION

Figure 1:
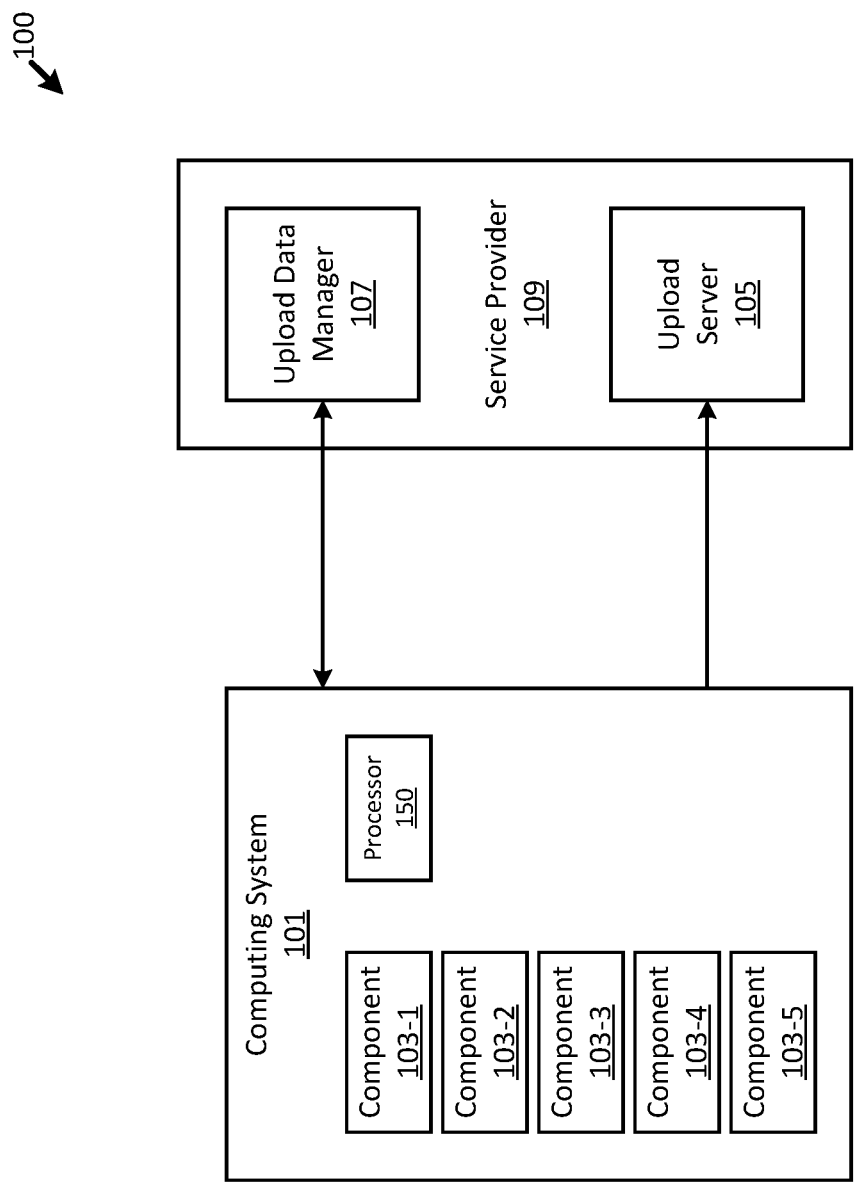
FIG. 1 is a block diagram of one embodiment of a computing system for dynamic handling of call home data.

Disclosed herein are various embodiments providing methods, systems, and computer program products that can provide dynamic handling of call home data. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

With reference now to the figures, FIG. 1 is a block diagram of a system 100 for dynamic handling of call home data. As illustrated in FIG. 1, the system 100 may include a computing system 101. As used herein, the system 100 may refer to a network of different computing devices and sub-systems, such as the computing system 101. As used herein, the computing system 101 may refer to a system of multiple devices and components. For example, the computing system 101 may be a storage system, multiple networked devices, sub-components in a device, or other combination of computational and electrical devices.

In certain embodiments, the computing system 101 may include a first component 103-1, a second component 103-2, a third component 103-3, a fourth component 103-4, and a fifth component 103-5. The first component 103-1, second component 103-2, third component 103-3, fourth component 103-4, and fifth component 103-5 are herein referred to collectively as components 103 and generally as component 103. While FIG. 1 shows the computing system 101 as including five components 103, the computing system 101 may include more components 103 or fewer components 103 based on the implementation of the computing system 101. Further, as used herein, a component 103 may refer to an electronic device or a set of electronic devices.

In some embodiments, where the computing system 101 is a storage system, one or more of the components 103 may be a memory storage device. The storage devices may include any suitable type of storage device or cluster of storage devices that are known or developed in the future that can store computer-usable data. In various embodiments, the storage devices may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection with directions from a respective controlling electronic device, such as the processor 150 or site controller for the system 100.

In certain embodiments, memory storage on the storage devices used by the components 103 and the system 100 may be implemented as direct-access storage devices (DASD). The memory storage, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

In some embodiments, the storage devices may include a cluster of separate storage devices that store data. For example, the components 103 may be part of a filesystem, where the filesystem may be a networked filesystem, a parallel filesystem, or other types of filesystem where multiple computing devices access the memory storage of the filesystem. In various embodiments, where the components 103 are storage devices, the components 103 may include non-volatile/persistent hardware and/or software configured to perform long-term data storage operations, including, but not limited to, data archiving, data backup, data mirroring, replicating data, etc. For instance, the storage devices may include non-volatile and/or persistent hardware and/or software to perform long-term data storage operations, which may include write operations, read operations, read-write operations, etc., among other operations.

In certain embodiments, where the components 103 are software components, a processing device, such as processor 150, may execute the components 103. For example, a component 103 may be a graphical user interface (GUI), a disk driver, a fail-over manager, a RAID controller, among other types of software components. Additionally, the components 103 may include a mixture of software and firmware components that function together as part of the computing system 101.

In additional embodiments, the computing system 101 may include a processor 150. As used herein, the processor 150 may be a computing device or a series of computing devices that can execute computer readable instructions. For example, the processor 150 may be a central processing unit, a multi-core processor, a hyper-threaded processor, a series of networked processors, and the like. In some embodiments, the processor 150 communicates with the components 103 to direct the operation of the components 103 and gather information about the operation of the components 103. Further, the processor 150 may be multiple processors, where each processor is associated with one or more of the components 103. For example, the component 103-1 may include a dedicated processor 150 that controls the gathering of information associated with the operation of the component 103-1. Further, the components 103-2 and 103-3 may include a different dedicated processor 150 that controls a gathering of information associated with the operation of both the component 103-2 and the component 103-3.

In certain embodiments, the processor 150 collects information from the components 103 and provides the collected information to an upload server 105 maintained by a service provider 109. As described herein, the upload server 105 may be a server that collects information from devices connected through a network connection such as an internet connection or other type of network connection. Further, the service provider 109, as used herein, may refer to a central repository or other storage location for gathering information related to the services associated with the components 103. In some embodiments, the service provider 109 may be associated with multiple services, where the storage locations for the different services may be at separate locations. Further, the multiple services may be provided by different companies, groups, and other organizations.

In certain embodiments, the service provider 109 may gather information related to the operation of the components 103. The components 103 may offer a call home mechanism through the processor 150, where the components 103 acquire data about operation and then send the data back to the service provider 109 when the component 103 experiences an error. Technical support, associated with the service provider 109, may then use the data received from the component 103 when trying to identify and fix the cause of the error at the component 103. For example, the component 103 may store logs and configuration data about the operation of the component 103. When an error occurs with the operation of the component 103, the component 103 may send information from the logs and configuration data to technical support for the organization that provided the component 103 that is experiencing the error. The component 103 may send the information to the upload server 105 found at the service provider 109.

In some embodiments, the data sent by the component 103 to the service provider 109 may be insufficient for identifying and fixing problems experienced by the component 103. For example, the component 103 may gather a large amount of information related to the operation of the component 103. Transmitting large amounts of gathered data from the component 103 to the service provider 109 may result in long upload times. Also, sifting through the large amount of data to troubleshoot the cause of the errors experienced by the component 103 may take a long time. Typically, to avoid the transmission of large amounts of data from the component 103 to the service provider 109, the component 103 sends a call home to the service provider 109 through the processor 150 executing the call home mechanism. When the service provider 109 receives the call home from a particular component 103, the service provider 109 may request the large collection of data recorded by the component 103.

Additionally, problems may arise on a component 103 that may apply to multiple users using a similar component 103 on different computing systems 101. The technical support associated with the service provider 109 may want to notify the multiple users about the potential problem and to provide the multiple users with a fix for the problem. As the data may be limited that the component 103 provides to the service provider 109, the data uploaded to the service provider 109 may be insufficient for diagnosing and fixing the problem experienced by the component 103 and verifying whether the error applies to similar components 103. The service provider 109 may request the large amounts of data associated with the log collection from the component 103 to identify the problem experienced by the component 103.

In certain embodiments, to dynamically adjust the call home data sent by a component 103 to the service provider 109, the service provider 109 may include an upload data manager 107. As used herein, the upload data manager 107 may be a system located at the service provider 109 that maintains a record of the information to include in uploads from the components 103 in the computing system 101. Further, when a component 103 experiences an error or an event, instead of sending a call home to the upload server 105 on the service provider 109, the event may trigger the component 103 to send a query to the upload data manager 107 that requests call home instructions. A trigger, as used herein, is an event that causes the component 103 to request call home instructions from the upload data manager 107. As used herein, call home instructions may refer to information that specifies what the component 103 should send to the upload server 105 when the component 103 experiences an error. For example, the call home instructions may specify what logs and other data to send to the upload server 105 based on characteristics of the error and the component 103 that experienced the error.

In certain embodiments, the call home instructions may specify what information to send and the amount of information to send based on the types of errors. Further, the upload data manager 107 may store information related to the call instructions in a call home definition. As used herein, the call home definition may refer to a record that associates an error and a component 103 with the information that should be sent to the upload server 105 when an error or other event occurs. By querying the upload data manager 107 when an event happens, the components 103 may send an appropriate measure and type of data to the upload server 105 to aid technical support when troubleshooting the operation of the component 103.

Figure 2:
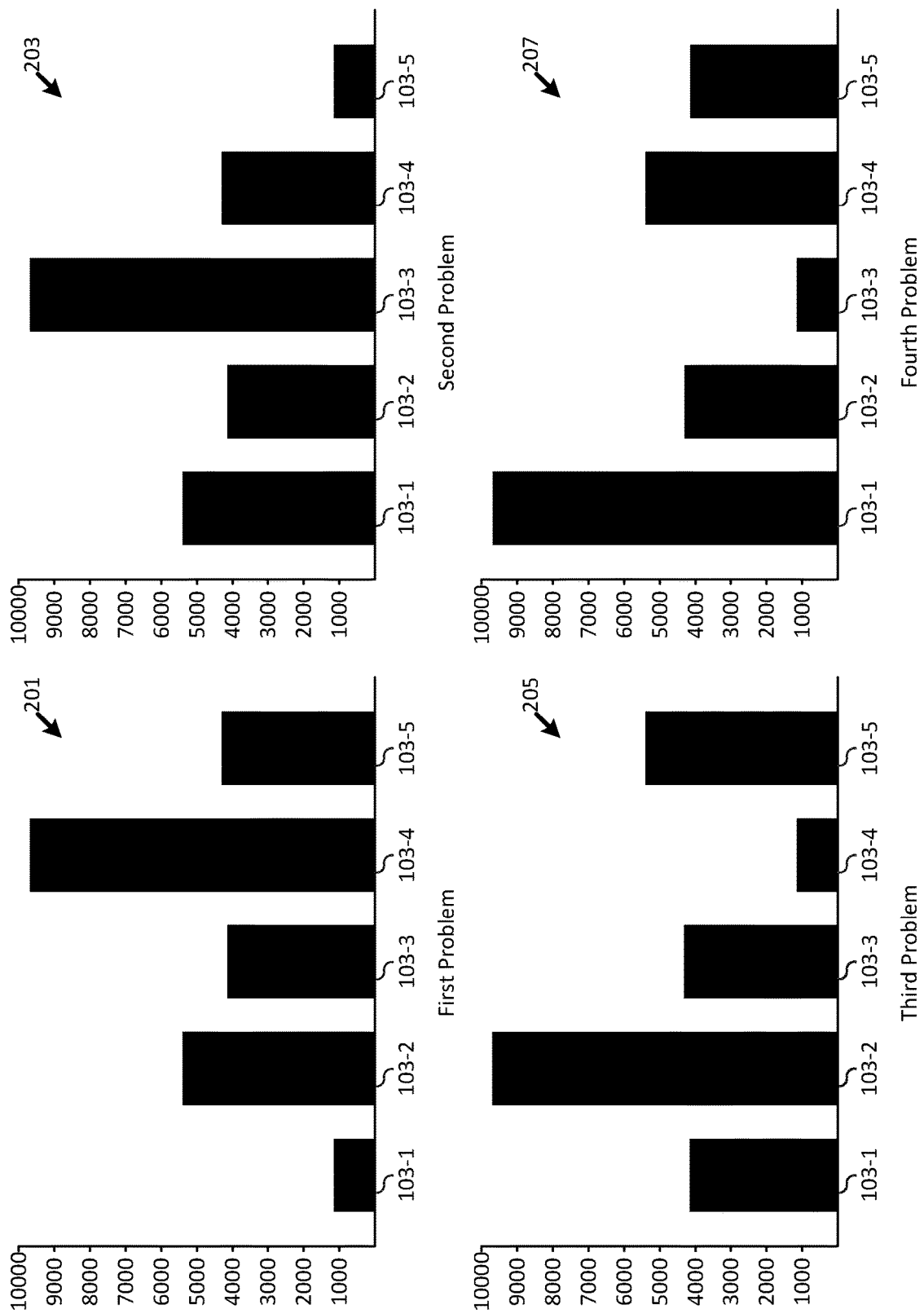
FIG. 2 is a series of graphs illustrating embodiments of different error codes registered by separate components in a computing system.

FIG. 2 is a series of graphs 201-207 that illustrate different error codes registered by separate components 103 in a computing system 101. For example, graph 201 illustrates different error codes produced by the different components 103-1-103-5 when the components 103 experience a first problem. Graph 203 illustrates different error codes produced by the different components 103-1-103-5 when the components 103 experience a second problem. Further, graph 205 illustrates the error codes produced by the different components 103-1-103-5 when the components 103 experience a third problem. Additionally, graph 207 illustrates the error codes produced by the different components 103-1-103-5 when the components 103 experience a fourth problem.

In certain embodiments, with regards to graph 201, the different components 103-1-103-5 may experience the first problem. When the different components 103 experience a problem, the components 103 may acquire an identifier for the problem. For example, the first component 103-1 may associate the identification number "1126" with the first problem; the second component 103-2 may associate the identification number "5376" with the first problem; the third component 103-3 may associate the identification number "4126" with the first problem; the fourth component 103-4 may associate the identification number "9650" with the first problem; and the fifth component 103-5 may associate the identification number "4276" with the first problem.

In further embodiments, a component 103 may associate different identification numbers for the various problems that can occur during the operation of the component 103. For example, the different components 103-1-103-5 identify different identification numbers for the second problem, third problem, and fourth problem as shown in graph 203, graph 205, and graph 207. Additionally, as compared to identification numbers for the different problems that may arise during operation of the components 103, the components 103 may identify different error codes, problem names, descriptions, or other types of information that may aid a service provider 109 when identifying the errors that occur on the one or more components 103.

Figure 3:
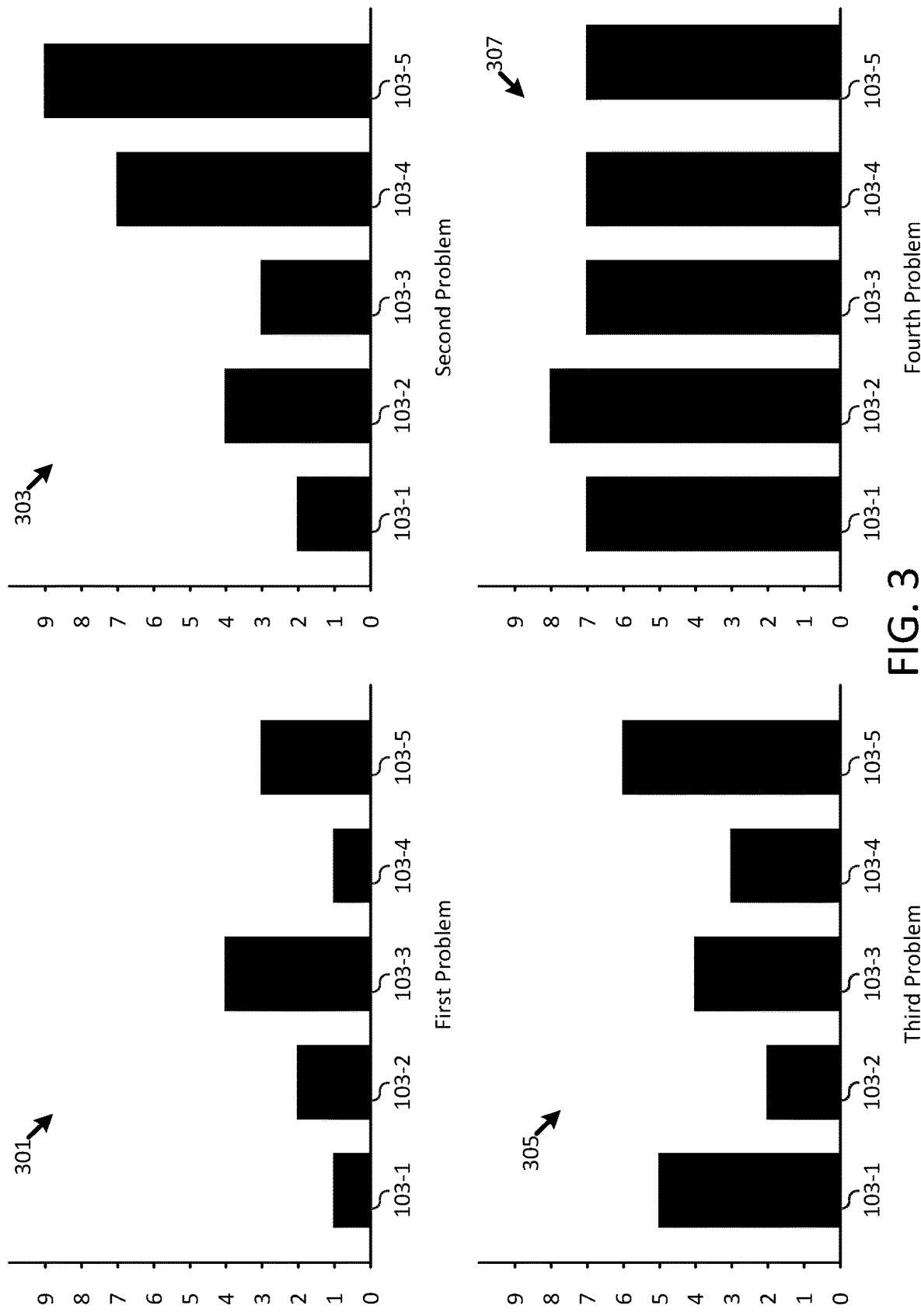
FIG. 3 is a series of graphs illustrating embodiments of different log levels for separate components in a computing system.

FIG. 3 is a series of graphs 301-307 illustrating different log levels associated with errors that may occur on the separate components 103 in a computing system 101. For example, graph 301 illustrates different log levels for the different components 103-1-103-5 when the components 103 experience a first problem. Graph 303 illustrates different log levels for the different components 103-1-103-5 when the components 103 experience a second problem. Further, graph 305 illustrates different log levels for the different components 103-1-103-5 when the components 103 experience a third problem. Additionally, graph 207 illustrates different log levels for the different components 103-1-103-5 when the components 103 experience a fourth problem.

In certain embodiments, with regards to graph 301, where the different components 103-1-103-5 experience the first problem, the components 103 may send the identifier for the first problem to the upload data manager 107. The upload data manager 107 may use the identifier to identify a log level for the component 103 and the first problem. As used herein, a log level is a quantifier or descriptor that specifies the type and/or amount of information to be uploaded by a component 103. For example, the upload data manager 107 may indicate that the first problem has a log level of "1" when either the first component 103-1 or the fourth component 103-4 reports the first problem. Additionally, the upload data manager 107 may indicate that the first problem has a log level of "2" when the second component 103-2 reports the first problem. Also, the upload data manager 107 may indicate that the first problem has a log level of "4" when the third component 103-3 reports the first problem. Further, the upload data manager 107 may indicate that the first problem has a log level of "3" when the fifth component 103-5 reports the first problem.

In further embodiments, the upload data manager 107 may associate different log levels with the different problems that may be experienced by a component 103. For example, the upload data manager 107 may specify different log levels for the components 103-1-103-5 based on the different identification numbers for the second problem, third problem, and fourth problem as shown in graph 203, graph 205, and graph 207.

As mentioned above, a log level may specify the type of information to include in the upload for a particular component 103. Information may come in a variety of types. For example, information may include error messages, warning messages, debugging information, operational information, among other types of information that could be tracked by the processor 150 and the component 103. A particular log level may indicate whether to send one of the error messages, the warning messages, the debugging information, the operational information, or any combination of the data. Additionally, the log level may specify whether a list of files and directories should be sent to the upload server 105 from the components 103. Also, the log level may specify whether the component 103 should send data collected by the particular component 103. Accordingly, when a component 103 experiences an error, the component 103 may communicate with the upload data manager 107 to acquire a log level associated with the error and the component 103. When the component 103 receives the log level from the upload data manager 107, the component 103 may identify the data to send to the upload server 105, where the data is identified by the log level. When the component 103 identifies the data, the component 103 then sends the data to the upload server 105.

Figure 4:
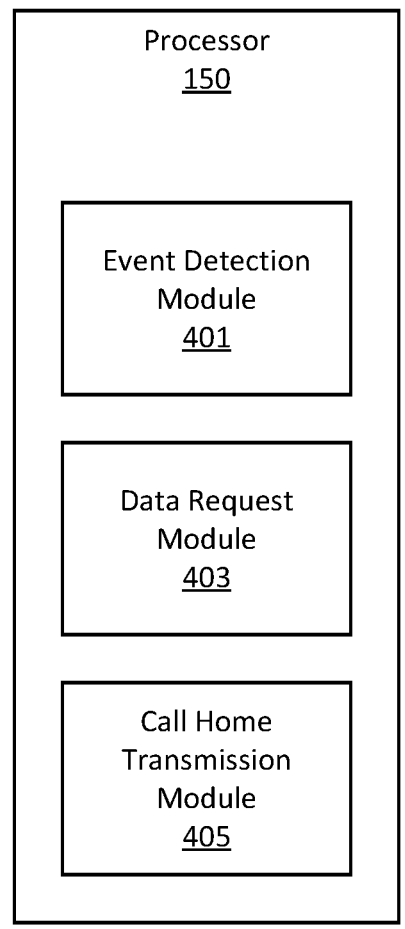
FIG. 4 is a block diagram illustrating an embodiment of a processor configured to provide dynamic handling of call home data.

FIG. 4 is a block diagram illustrating one embodiment of a processor 150 for providing dynamic handling of call home data. In certain embodiments, as used herein, the processor 150 may be a general-purpose computer, special purpose computer, multiple processors, or other programmable data processing apparatus. In some embodiments, the processor 150 may be one or more processors on the computing system 101 capable of communicating with the service provider 109 as described in connection with FIG. 1. For example, the processor 150 may include an event detection module 401, a data request module 403, and a call home transmission module 405. As described herein, the event detection module 401 may detect one or more events in the operation of the components 103. Further, the data request module 403 may request call home instructions from an upload data manager 107 in response to the detected one or more events, where the upload data manager 107 provides call home instructions to the component 103. Also, the call home transmission module 405 may send call home data based on the call home instructions and provide the collected data to an upload server 105.

In certain embodiments, the event detection module 401 may detect events that occur during the operation of the components 103. For example, during the operation of a component 103, the component 103 may experience one or more types of events. As used herein, an event may refer to a detectable change in the state of the component 103. An event may include an error, a file operation, a user generated operation, communications received from other components, software generated events, or other detectable events. When one of these events occurs, the event detection module 401 may raise a flag, generate an event, or perform another action to indicate that the component 103 has experienced an event.

In some embodiments, when the event detection module 401 detects the occurrence of events, the event detection module 401 may acquire an identifier. As described above, the identifier may be a number, a code, a description, a name and the like.

In further embodiments, when the event detection module 401 has detected an event, the data request module 403 may send a message to an upload data manager 107 requesting that the upload data manager 107 send call home instructions to the component 103. For example, the event detection module 403 may send the acquired identifier to the upload data manager 107. The upload data manager 107, upon receiving the identifier from the event detection module 403, may use the identifier to identify call home instructions associated with the identifier. In some embodiments, the upload data manager 107 may identify a log level associated with the component 103 and the identifier associated with the detected event. Based on the log level, the upload data manager 107 may select call home instructions for the particular component 103 and identified error.

In certain embodiments, when the upload data manager 107 identifies the call home instructions associated with the identifier, the upload data manager 107 may send the identified call home instructions to the component 103. Based on the received call home instructions, the call home transmission module 405 may send call home data to the upload server 105. For example, the call home instructions, received by the component 103, may include a log level that specifies what data the call home transmission module 405 should send to the upload server 105. Alternatively, the call home instructions may specify a list of files and directories that the call home transmission module 405 may send to the upload server 105. For example, the call home instructions may specify a file such as the file "/var/log/messages." Also, the call home instructions may specify a directory such as the directory "/var/log/gui/," wherein the call home transmission module 405 may send the files falling under the particular directory to the upload server 105. Further, the call home instructions may specify a regular expression, a wildcard, or other expression that potentially matches one or more files stored by the component 103. For example, the call home instructions may request that the call home transmission module 405 send the files that match the expression "/var/log/storage/error*" to the upload server 105. The call home transmission module 405 may then attempt to identify the files and directories that match the expression and send the identified files and directories to the upload server 105. Additionally, the call home transmission module 405 may send the call home data to the upload server 105 in a common data format, such as XML, CSV, JSON, and the like. Also, the call home transmission module 405 may send the call home data to the upload server 105 in a proprietary format.

In further embodiments, a component 103 may collect data during operation, where the component 103 collects data specified by a predefined data collection. As used herein, a predefined data collection may refer to a set of data collected by a particular component 103 that is collected with the intent of providing the data to another device when a particular event occurs. Accordingly, when the component 103 requests call home instructions from the upload data manager 107, the upload data manager 107 may reply with the identity of the component 103 or other message type that instructs the call home transmission module 405 to send the predefined data collection associated with the component 103. For example, when the component 103 is a disk drive, the upload data manager 107 may request the name of the disk drive, whereupon the call home transmission module 405 for the disk drive may send the call home instructions to the upload server 105.

In further embodiments, the component 103 may include multiple sub-components, where the different sub-components collect data specified by a predefined data collection. Accordingly, when the component 103 requests call home instructions, the upload data manager 107 may identify the sub-component associated with the request for call home instructions. The upload data manager 107 may then transmit an identifier for the sub-component. For example, the component 103 may include sub-components like a disk drive, GUI, controller, and the like. The upload data manager 107 may send call home instructions to the component 103 that identifies a specific sub-component of the component 103. The call home transmission module 405 may then send the collected data associated with the specific subcomponent to the upload server 105. Accordingly, the call home transmission module 405 may send the call home data to the upload server 105 specified by the call home instructions received from the upload data manager 107.

Figure 5:
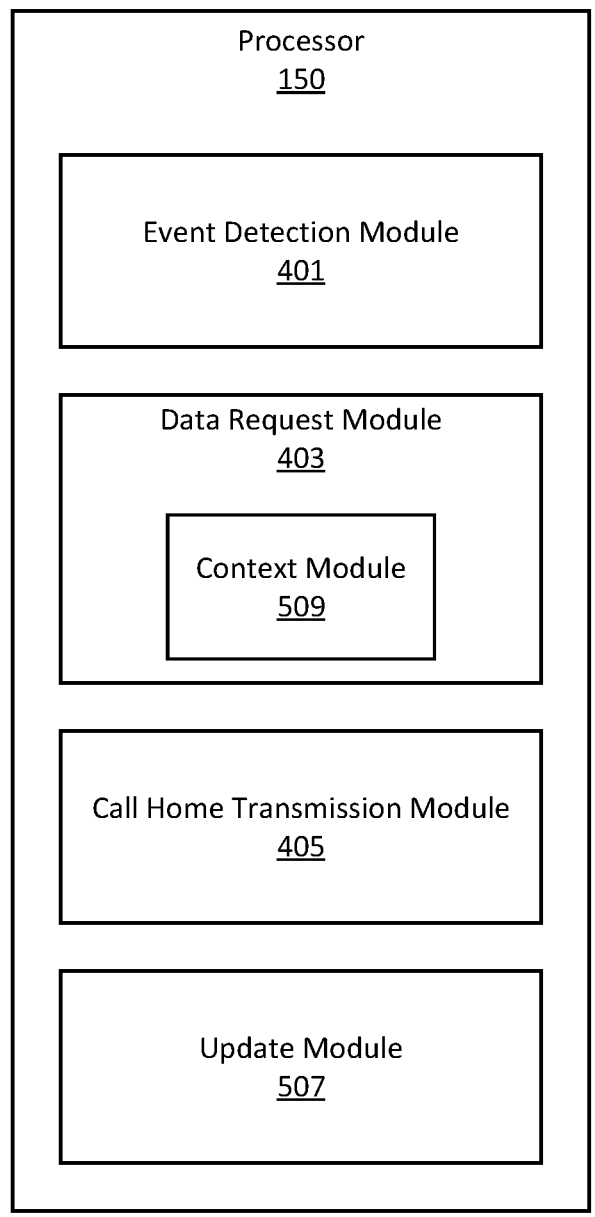
FIG. 5 is a block diagram illustrating a further embodiment of a processor configured to provide dynamic handling of call home data.

FIG. 5 is a block diagram illustrating a further embodiment of a processor 150 for providing dynamic handling of call home data. The processor 150, in various embodiments, may be substantially similar to the processor 150 described above with regards to FIG. 4. In the depicted embodiment, the processor 150 may include an event detection module 401, a data request module 403, and a call home transmission module 405, which may be configured substantially similar as described above with regards to the event detection module 401, the data request module 403, and the call home transmission module 405 of FIG. 4. Additionally, the processor 150 may include an update module 507. As described herein, the update module 507 may update call home definitions stored by the upload data manager 107. Further, the data request module 403 may include a context module 509 that gathers context information related to events detected by the event detection module 401 for transmission to the upload data manager 107.

In certain embodiments, the update module 507 updates the call home definitions stored by the upload data manager 107. During initial configuration of the call home definition stored on the upload data manager 107, the update module 507 may improve the call home definition so that data requested from the components 103 is better suited for indicating the causes of the events detected by the event detection module 401. To improve the call home definition stored on the upload data manager 107, the update module 507 may update the call home definition to improve the utility and efficiency of the call home data sent by the call home transmission module 405 to the upload server 105.

In some embodiments, the update module 507 updates the call home definition by saving a call home definition manually provided by an individual. For example, an individual charged with providing technical support for a particular component 103, such as a support engineer, may access the upload data manager 107 and manually enter a call home definition for a particular component 103 or for multiple components 103. After a support individual manually enters the call home definition, the support individual or other individual may periodically update the call home definition or other methods may periodically update the call home definition. By manually updating the call home definition, a support individual may request specific information from the component 103 to aid the support individual in addressing the event detected by the event detection module 401 and preventing similar events from occurring in other similar components 103.

In other embodiments, the update module 507 may monitor a problem tracking database for currently known problems. The update module 507 may classify the current problems and direct the upload data manager 107 to include data that might help identify currently known issues. For example, if a certain component 103 experiences issues for many individuals, the update module 507 may update the call home definition to request detailed log files for the component 103 experiencing issues. By monitoring a problem tracking database for currently known problems, the update module 507 may update the call home definition stored at the upload data manager 107 to facilitate the spotting of similar problems for similar components 103 before customers using the similar components 103 report that a component 103 is experiencing a problem.

In further embodiments, the update module 507 may monitor support data. Typically, support data may be stored on an analysis system where the data is available for inspection by technical support personnel, such as support engineers. The support engineers may manually review the support data or use analysis tools to inspect the data. Using information regarding the review of support data, the update module 507 may determine which parts of the support data, provided by a component 103, have been accessed by the support personnel and the analysis tools. Also, the update module 507 may identify which parts of the support data, provided by the component 103, have not been accessed by support personnel and the analysis tools for a period of time. The update module 507 may then exclude the portions of the support data that have not been recently accessed from the call home definition for a particular component 103. By excluding portions of the call home data from the call home definition, the update module 507 may reduce the size of data that is transmitted by the call home transmission module 405 to the upload server 105. As part of excluding portions of the call home data, the update module 507 may define log levels for particular components 103 as described above with respect to FIGS. 2 and 3.

In certain embodiments, the context module 509 may gather context information related to the events detected by the event detection module 401. For example, when the event is an error, the context module 509 may acquire an identifier for the error and the component 103. In some embodiments, the context module 509 may acquire an identifier for a device that is part of the component. The data request module 403 may send the acquired identifiers to the upload data manager 107, whereupon the upload data manager 107 may specify a log level based on the identifiers in the context information. In further embodiments, the context module 509 may provide additional information beyond the identifiers to the upload data manager 107. For example, the additional information may include identifiers for other components 103 that were communicating with the component 103 that generated the event. Also, the additional information may include information that may aid the upload data manager 107 in identifying a log level for a particular event.

Figure 6:
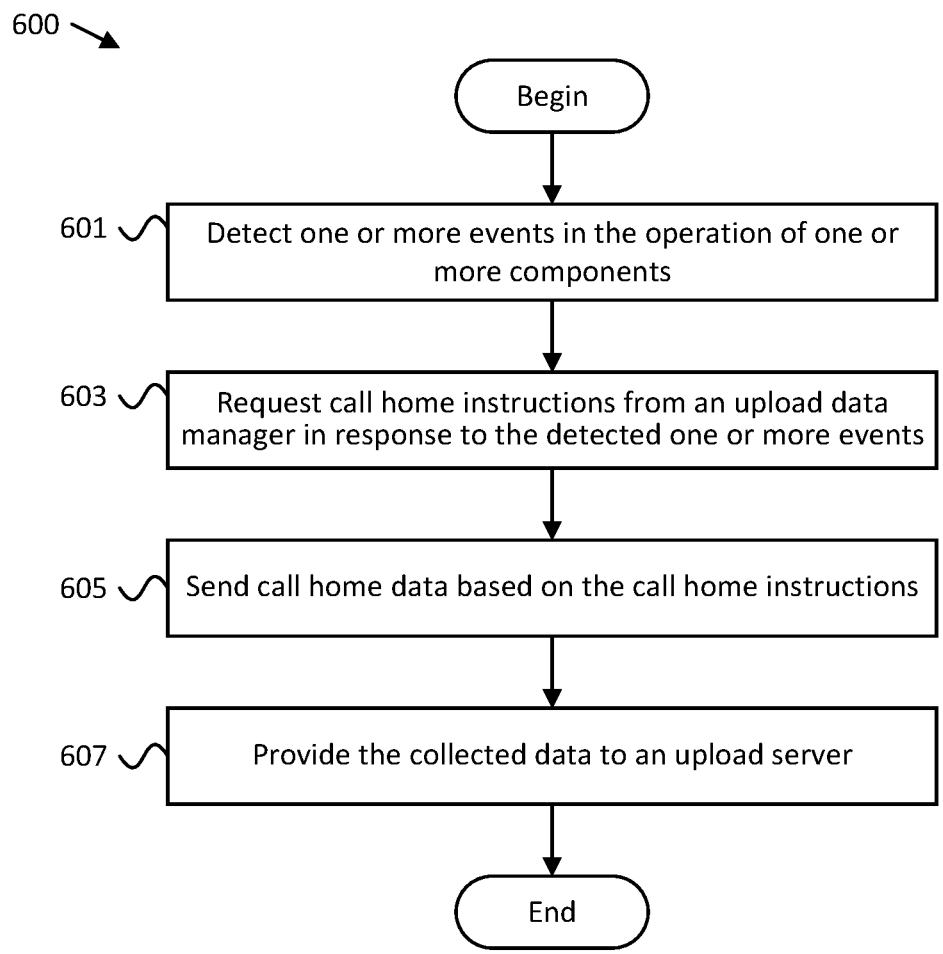
FIG. 6 is a flowchart diagram illustrating one embodiment of a method for providing dynamic handling of call home data.

FIG. 6 is a flow chart diagram illustrating an embodiment of a method 600 for providing dynamic handling of call home data. In certain embodiments, the method 600 proceeds at 601, where one or more events in the operation of one or more components 103 is detected. Further, the method 600 proceeds at 603, where call home instructions are requested from an upload data manager 107 in response to the detected one or more events. Additionally, the method 600 proceeds at 605, where call home data is sent based on the call home instructions. Furthermore, the method 600 proceeds at 607, where the collected data is provided to an upload server.

Figure 7:
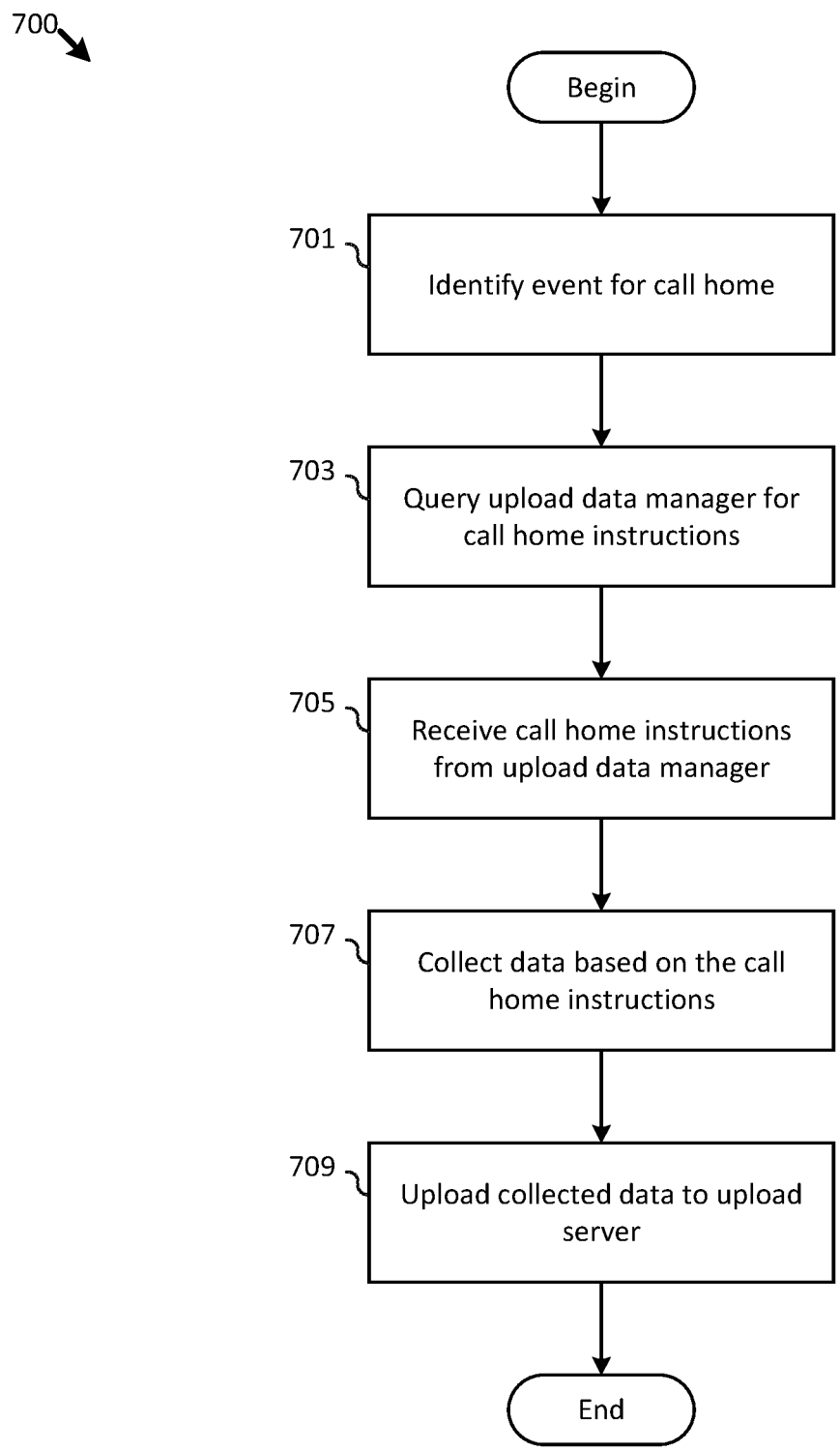
FIG. 7 is a flowchart diagram illustrating one embodiment of a method for acquiring call home data from a computing system for call home data.

FIG. 7 is a flowchart diagram illustrating a method 700 for acquiring call home data from a computing system 101. The method 700 proceeds at 701, where an event is identified for a call home. For example, the event detection module 401 may detect that an event has occurred on a component 103, where an event may be an error, an exception, a trigger, or other occurrence in the operation of the component 103. When the event is identified, the method proceeds at 703, where an upload data manager 107 is queried for call home instructions. For example, when the event occurs, a data request module 403 may request call home instructions from the upload data manager 107 by sending an identifier for the component 103 to the upload data manager 107.

In some embodiments, when the upload data manager 107 has been queried for call home instructions, the method 700 proceeds at 705, where call home instructions are received from the upload data manager 107. For example, the upload data manager 107 may identify call home instructions associated with the component 103 experiencing the detected event. The upload data manager 107 may then send the call home instructions to the computing system 101 and/or the component 103. When the call home instructions have been received, the method 700 proceeds at 707, where data is collected based on the call home instructions. For example, the computing system 101 and/or a component 103 may identify stored data that is associated with the call home instructions received from the upload data manager 107. The computing system 101 may then collect the data specified by the call home instructions. When the computing system 101 has collected the data specified by the call home instructions, the method 700 proceeds at 709, where collected data is uploaded to an upload server 105. For example, the call home transmission module 405 may send the collected data to the upload server 105. When the data is received by the upload server 105, the data may be used for troubleshooting or for some other appropriate response to the detected event.

Figure 8:
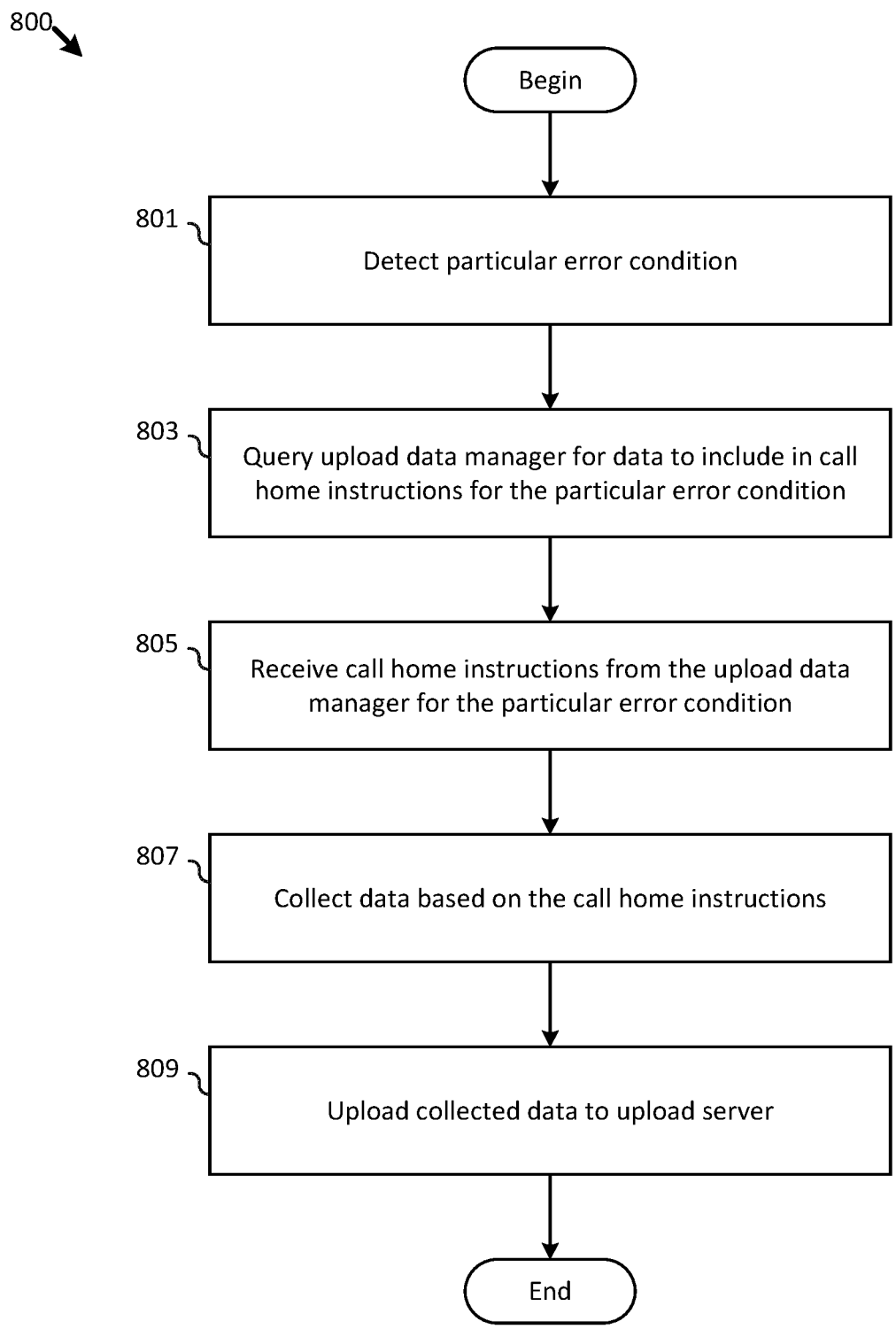
FIG. 8 is a flowchart diagram illustrating one embodiment of a method for acquiring call home data from a computing system where the call home data is related to a specific error.

FIG. 8 is a flowchart diagram illustrating a method 800 for acquiring call home data from a computing system 101, where the call home data is related to a specific error. The method 800 proceeds at 801, where a particular error condition is detected. For example, the event detection module 401 may detect that an error has occurred on a component 103. Further, as part of detecting the error condition, the event detection module 401 may also acquire an identifier for the detected error. When the error is identified, the method 800 proceeds at 803, where an upload data manager 107 is queried for data to include in the call home instructions for the particular error condition. For example, when the error occurs, a data request module 403 may request call home instructions from the upload data manager 107 by sending an identifier for the component 103 and the error to the upload data manager 107.

In some embodiments, when the upload data manager 107 has been queried for call home instructions for the particular error, the method 800 proceeds at 805, where call home instructions are received from the upload data manager 107 for the particular error condition. For example, the upload data manager 107 may identify call home instructions associated with the component 103 experiencing the detected error. The upload data manager 107 may then send the call home instructions to the computing system 101 and/or the component 103. When the call home instructions have been received, the method 800 proceeds at 807, where data is collected based on the call home instructions. For example, the computing system 101 and/or a component 103 may identify stored data that is associated with the call home instructions received from the upload data manager 107. The computing system 101 may then collect the data specified by the call home instructions. When the computing system 101 has collected the data specified by the call home instructions, the method 800 proceeds at 809, where collected data is uploaded to an upload server 105. For example, the call home transmission module 405 may send the collected data to the upload server 105. When the data is received by the upload server 105, the data may be used for troubleshooting or for some other appropriate response to the detected event.

Figure 9:
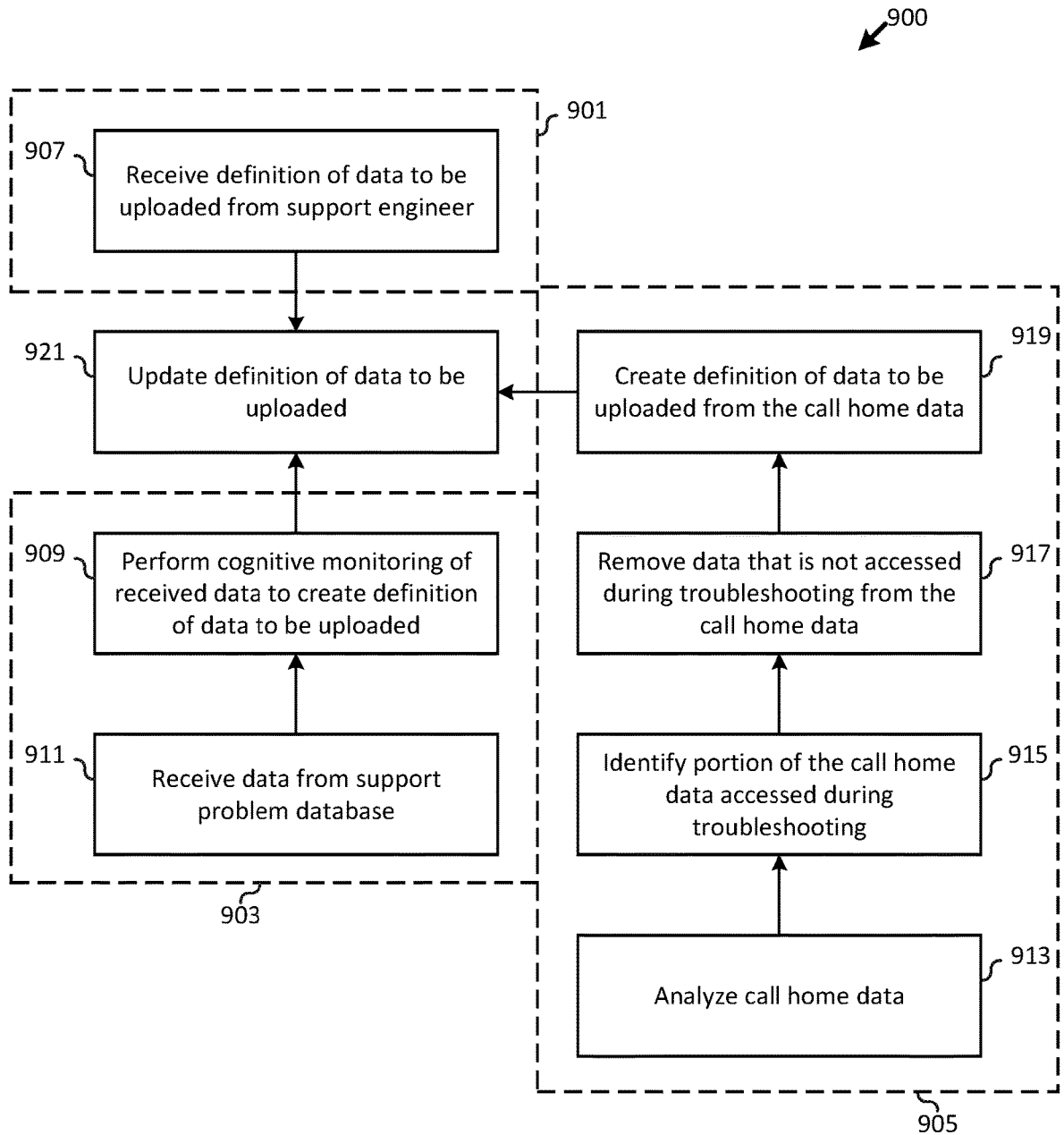
FIG. 9 is a flowchart diagram illustrating one embodiment of a method for updating a call home definition stored on an upload data manager.

FIG. 9 is a flowchart diagram illustrating a method 900 for updating a call home definition stored on an upload data manager 107. As illustrated, the method 900 includes three separate sub-methods for updating a call home definition. A first sub-method 901, a second sub-method 903, and a third sub-method 905. The three different sub-methods 901, 903, and 905 may provide alternative means for updating the call home definition for a particular component 103.

In certain embodiments, the sub-method 901 proceeds at 907, where a call home definition of data to be uploaded is received from a support engineer. For example, as described above, an individual charged with providing technical support, such as a support engineer, may access the upload data manager 107 and manually provide a call home definition for one or more components 103. When the call home definition is received from the support engineer, the sub-method 901 proceeds at 921, where the call home definition of data to be uploaded is updated. For example, after the call home definition is manually entered, the call home definition may be periodically updated either manually or through other methods for updating the call home definition.

In some embodiments, the sub-method 903 may proceed at 911, where data is received from a support problem database. When the sub-method 903 receives the data from the support problem database, the sub-method 903 may proceed at 909, where cognitive monitoring of received data is performed to create a call home definition of data to be uploaded. For example, as described above, an update module 507 may monitor a problem tracking database for currently known problems. The update module 507 may classify the current problems and direct the upload data manager 107 to include data that might help identify currently known issues. When the call home definition is created, the sub-method 903 may proceed at 921, where the call home definition of data to be uploaded is updated. For example, the call home instructions found by monitoring the problem tracking database may be used to update the call home definitions stored on the upload data manager 107.

In further embodiments, the sub-method 905 may proceed at 913, where call home data is analyzed. The sub-method 905 may proceed at 915, where portions of the call home data accessed during troubleshooting are identified. Further, when the portions of the call home data that is accessed are identified, the sub-method 905 may proceed at 917, where data that is not accessed during troubleshooting is removed from the call home data. Additionally, when the non-accessed portions of data are removed, the sub-method 905 may proceed at 919, where a definition of data to be uploaded from the call home data is created. When the call home definition is created, the sub-method 905 may proceed at 921, where the call home definition of data to be uploaded is updated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   an event detection module that detects one or more events in the operation of one or more components;
   a data request module that requests call home instructions from an upload data manager in response to the detected one or more events, wherein the upload data manager provides call home instructions;

a call home transmission module that:
  sends call home data based on the call home instructions, and
  provides the collected data to an upload server; and
an update module that:
  analyzes previously received call home data,
  identifies data accessed in the previously received call home data during troubleshooting, and
  removes data specified in a call home definition that is associated with previously received call home data that was not updated during the troubleshooting,
wherein at least a portion of each of said modules comprises one or more of a set of hardware circuits, a set of programmable hardware devices, and executable code stored on a set of non-transitory computer-readable storage media.

2. The system of claim 1, wherein the one or more events comprises a trigger that causes a device in the one or more components to request the call home instructions.

3. The system of claim 1, wherein the one or more events comprises an error condition.

4. The system of claim 1, wherein the data request module comprises a context module that gathers context information related to the one or more events.

5. The system of claim 4, wherein the context information identifies an error and at least one device in the one or more components.

6. The system of claim 4, wherein the upload data manager specifies a log level based on the context information, wherein the upload data manager provides the log level as part of the call home instructions, the log level specifying the information to be sent to the upload server from the one or more components.

7. The system of claim 1, wherein the update module is configured to update the call home definition for the upload data manager.

8. The system of claim 7, wherein the call home definition is manually configured.

9. The system of claim 7, wherein the update module:
  acquires information from a support problem database; and defines the call home definition based on the acquired information.

10. A method, comprising:
  detecting one or more events in the operation of one or more components;
  requesting call home instructions from an upload data manager in response to the detected one or more events, wherein the upload data manager provides call home instructions;
  sending call home data based on the call home instructions;
  providing the collected data to an upload server;
  analyzing previously received call home data;
  identifying data accessed in the previously received call home data during troubleshooting; and
  removing data specified in a call home definition that is associated with previously received call home data that was not updated during the troubleshooting.

11. The method of claim 10, further comprising gathering context information related to the one or more events.

12. The method of claim 11, wherein the context information identifies an error and at least one device in the one or more components.

13. The method of claim 11, wherein the upload data manager specifies a log level based on the context information, wherein the upload data manager provides the log level as part of the call home instructions, the log level specifying the information to be sent to the upload server from the one or more components.

14. The method of claim 10, further comprising updating the call home definition for the upload data manager.

15. The method of claim 14, wherein the call home definition is manually configured.

16. The method of claim 14, further comprising:
  acquiring information from a support problem database; and defining the call home definition based on the acquired information.

17. A computer program product comprising a computer-readable storage medium including program instructions embodied therewith, the program instructions executable by a processor to cause the processor to:
  detect one or more events in the operation of one or more components;
  request call home instructions from an upload data manager in response to the detected one or more events, wherein the upload data manager provides call home instructions;
  send call home data based on the call home instructions;
  provide the collected data to an upload server;
  analyze previously received call home data;
  identify data accessed in the previously received call home data during troubleshooting; and
  remove data specified in a call home definition that is associated with previously received call home data that was not updated during the troubleshooting.

18. The computer program product of claim 17, wherein the program instructions further cause the processor to gather context information related to the one or more events.

19. The computer program product of claim 18, wherein the context information identifies an error and at least one device in the one or more components.

20. The computer program product of claim 17, wherein the program instructions further cause the processor to update the call home definition for the upload data manager.

* * * * *